(12) United States Patent
Gordhamer

(10) Patent No.: US 10,155,681 B1
(45) Date of Patent: Dec. 18, 2018

(54) WATER TREATMENT SYSTEMS AND METHODS

(71) Applicant: Robert J. Gordhamer, Sammamish, WA (US)

(72) Inventor: Robert J. Gordhamer, Sammamish, WA (US)

( * ) Notice: Subject to any disclaimer, the term of this patent is extended or adjusted under 35 U.S.C. 154(b) by 0 days.

(21) Appl. No.: 16/040,417

(22) Filed: Jul. 19, 2018

(51) Int. Cl.
| | |
|---|---|
| *C02F 1/00* | (2006.01) |
| *C02F 1/58* | (2006.01) |
| *C02F 1/68* | (2006.01) |
| *F16K 35/02* | (2006.01) |
| *F16K 31/60* | (2006.01) |
| *C02F 101/12* | (2006.01) |

(52) U.S. Cl.
CPC ............... *C02F 1/58* (2013.01); *C02F 1/006* (2013.01); *C02F 1/685* (2013.01); *F16K 31/602* (2013.01); *F16K 35/025* (2013.01); *C02F 2101/12* (2013.01); *C02F 2201/005* (2013.01); *C02F 2301/043* (2013.01)

(58) Field of Classification Search
CPC .......... C02F 1/58; F16K 31/602; F16K 35/02; F16K 35/022; F16K 35/025
See application file for complete search history.

(56) References Cited

U.S. PATENT DOCUMENTS

| | | | | |
|---|---|---|---|---|
| 1,659,843 | A * | 2/1928 | Trottier | F16K 35/025 126/42 |
| 3,148,553 | A * | 9/1964 | Carr | F16K 35/025 251/230 |
| 5,285,997 | A * | 2/1994 | Chang | F16K 35/025 251/102 |
| 5,647,389 | A * | 7/1997 | Holloway | F16K 31/602 137/15.18 |
| 5,746,923 | A * | 5/1998 | Forward | B08B 9/032 134/22.11 |
| 5,772,177 | A * | 6/1998 | Holloway | F16K 35/025 251/104 |
| 6,129,850 | A * | 10/2000 | Martin | C02F 1/78 210/167.11 |
| 6,264,846 | B1 | 7/2001 | Smith | |
| 6,464,885 | B1 | 10/2002 | Smith | |
| 2005/0161624 | A1 * | 7/2005 | Bancroft | F16K 31/602 251/109 |
| 2009/0261280 | A1 * | 10/2009 | Matsushita | F16K 35/025 251/101 |
| 2015/0034853 | A1 * | 2/2015 | Gutmann | F16K 35/022 251/230 |

* cited by examiner

*Primary Examiner* — Reinaldo Sanchez-Medina
(74) *Attorney, Agent, or Firm* — Michael R. Schacht; Schacht Law Office, Inc.

(57) ABSTRACT

A water processing system for dechlorinating a stream of pressurized water comprising a main housing and a bypass housing. A flow control lever is connected to a flow control member. A lock flange defining a plurality of lock openings is rigidly supported by the flow control lever. A lock housing is secured relative to the flow control housing, and a lock pin is supported by the lock housing for movement between a locked position and an unlocked position. When the lock pin is in the locked position, the lock pin extends through one of the lock openings in the lock flange to inhibit movement of the flow control lever relative to the main housing. When the lock pin is in the unlocked position, the lock pin is withdrawn from the lock openings in the lock flange to allow movement of the flow control lever relative to the main housing.

6 Claims, 8 Drawing Sheets

WATER TREATMENT SYSTEMS AND METHODS

TECHNICAL FIELD

The present invention relates to the treatment of water that is discharged into the environment and, more specifically, to the processing of water such as the removal or addition of chlorine and chloramines from or to water discharged from water lines during flushing, initial disinfecting, testing, and the like.

BACKGROUND OF THE INVENTION

Treated water is often discharged from utility water systems during flushing, testing, and the like. Utility water is often treated for human consumption with chemicals such as chlorine.

Traditionally, chlorinated water was simply discharged into the surrounding environment. More recently, it has been recognized that chlorinated water may be disruptive to the ecology of the environment into which it is discharged. Accordingly, attempts have been made to treat the utility water before it is discharged into the environment to prevent ecological disruption.

The present invention relates to improved systems and methods of treating chlorinated utility water discharged into the surrounding environment such that the water does not disrupt the ecology of the surrounding environment.

SUMMARY OF THE INVENTION

The present invention may be embodied as a water processing system for dechlorinating a stream of pressurized water comprising a main housing and a bypass housing. The main housing assembly comprises a flow control housing defining a flow control chamber, an inlet member defining an inlet opening configured to receive the stream of pressurized water, an outlet member defining an outlet opening, a flow control member supported within the flow control chamber for rotation about a flow control axis between a first end position and a second end position, the flow control member defining a flow control passageway, a flow control lever connected to the flow control member, a lock flange rigidly supported by the flow control lever, the lock flange defining a plurality of lock openings, a lock housing secured relative to the flow control housing, and a lock pin supported by the lock housing for movement between a locked position and an unlocked position. The flow control housing, the inlet member, and the outlet member define a primary passageway that extends from the inlet opening to the outlet opening through the flow control chamber. The bypass housing is supported relative to the main housing assembly to define an additive port and a bypass passageway extending between a first portion of the primary passageway, where the first portion of the primary passageway is between the inlet opening and the flow control chamber and a second portion of the bypass passageway, where the second portion of the primary passageway is between the flow control chamber and the outlet opening. The bypass passageway defines an injection portion, and the additive port is in fluid communication with the injection portion of the bypass passageway. When the lock pin is in the locked position, the lock pin extends through one of the lock openings in the lock flange to inhibit movement of the flow control lever relative to the main housing. When the lock pin is in the unlocked position, the lock pin is withdrawn from the lock openings in the lock flange to allow movement of the flow control lever relative to the main housing.

The present invention may also be embodied as a method of dechlorinating a stream of pressurized water comprising the following steps. A flow control housing defining a flow control chamber, an inlet member defining an inlet opening, and an outlet member defining an outlet opening are provided. The flow control housing, the inlet member, and the outlet member are operatively connected to define a primary passageway that extends from the inlet opening to the outlet opening through the flow control chamber. A flow control member defining a flow control passageway is supported within the flow control chamber for rotation about a flow control axis between a first end position and a second end position. A flow control lever is operatively connected to the flow control member. A lock flange defining a plurality of lock openings is rigidly supported on the flow control handle. A lock housing is secured relative to the flow control housing. A lock pin is supported by the lock housing for movement between a locked position and an unlocked position. A bypass housing defining a bypass passageway, an injection port, and an additive in fluid communication with the injection port is provided. The bypass housing is supported relative to the main housing assembly such that the bypass passageway extends between a first portion of the primary passageway, where the first portion of the primary passageway is between the inlet opening and the flow control chamber and a second portion of the bypass passageway, where the second portion of the primary passageway is between the flow control chamber and the outlet opening. The lock pin is arranged in the locked position such that the lock pin extends through one of the lock openings in the lock flange to inhibit movement of the flow control lever relative to the main housing. The lock pin is arranged in the unlocked position such that the lock pin is withdrawn from the lock openings in the lock flange to allow movement of the flow control lever relative to the main housing.

DETAILED DESCRIPTION OF THE PREFERRED EMBODIMENTS

Figure 1:
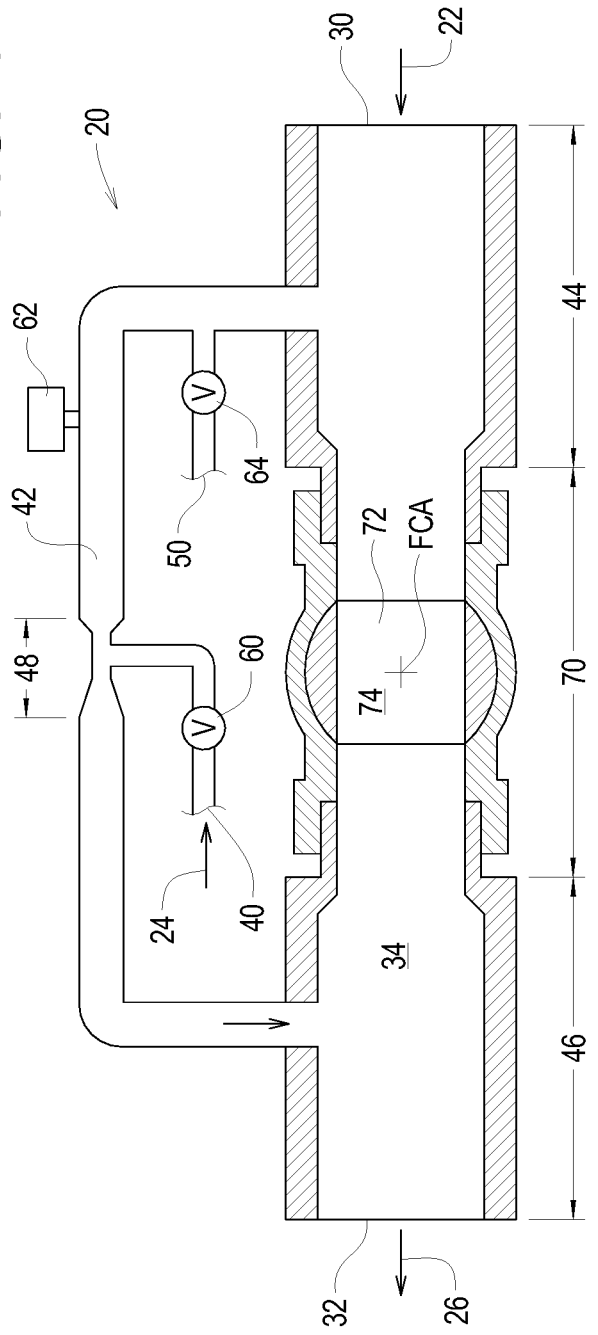
FIG. 1 is a somewhat schematic section view of a first example water processing system constructed in accordance with, and embodying, the principles of the present invention, the first example water processing being depicted in a fully open configuration.
Figure 2:
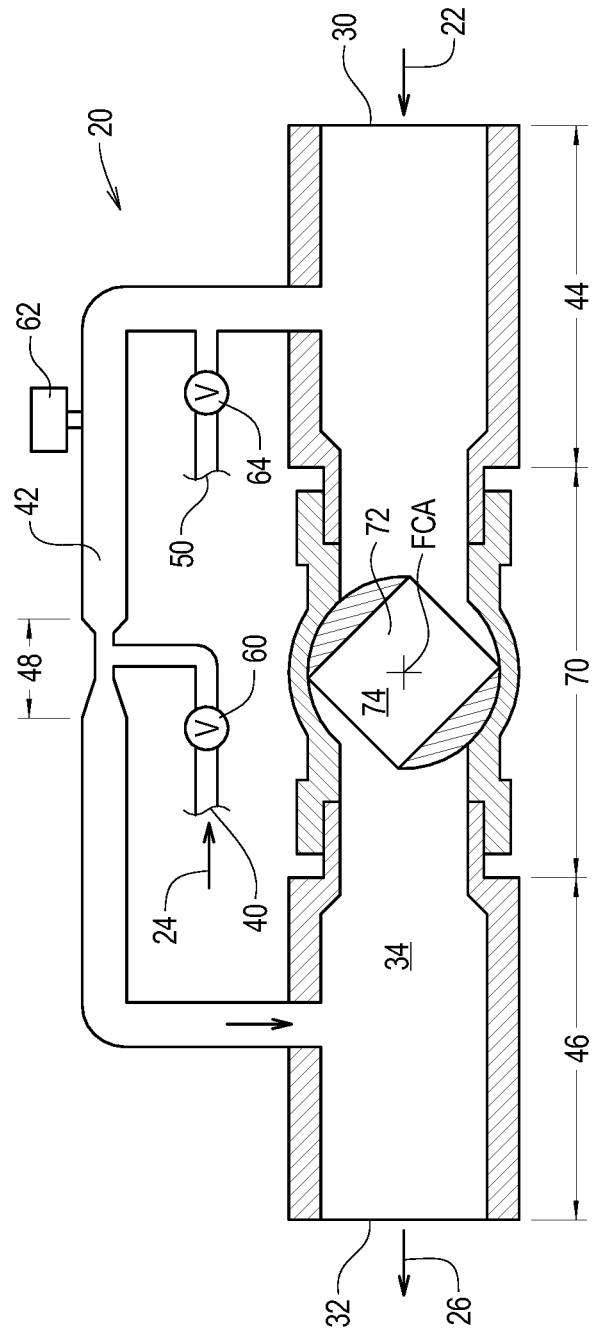
FIG. 2 is a somewhat schematic section view of the first example water processing system in a partly open configuration.
Figure 3:
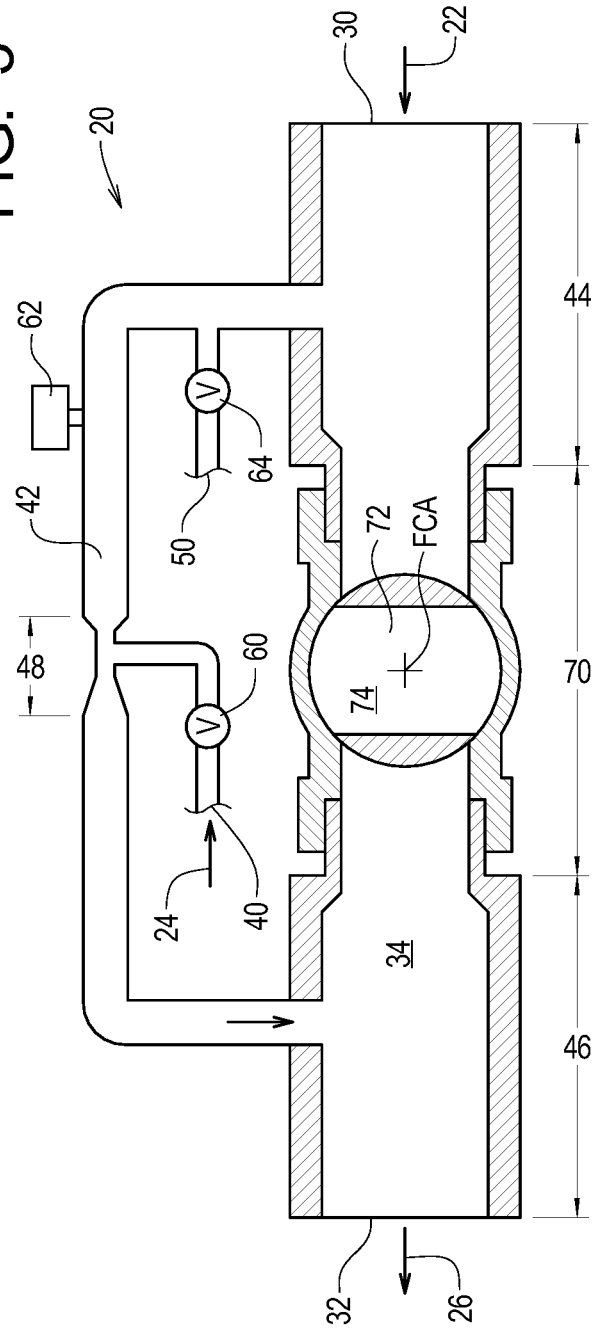
FIG. 3 is a somewhat schematic section view of the first example water processing system in a closed configuration.
Figure 4:
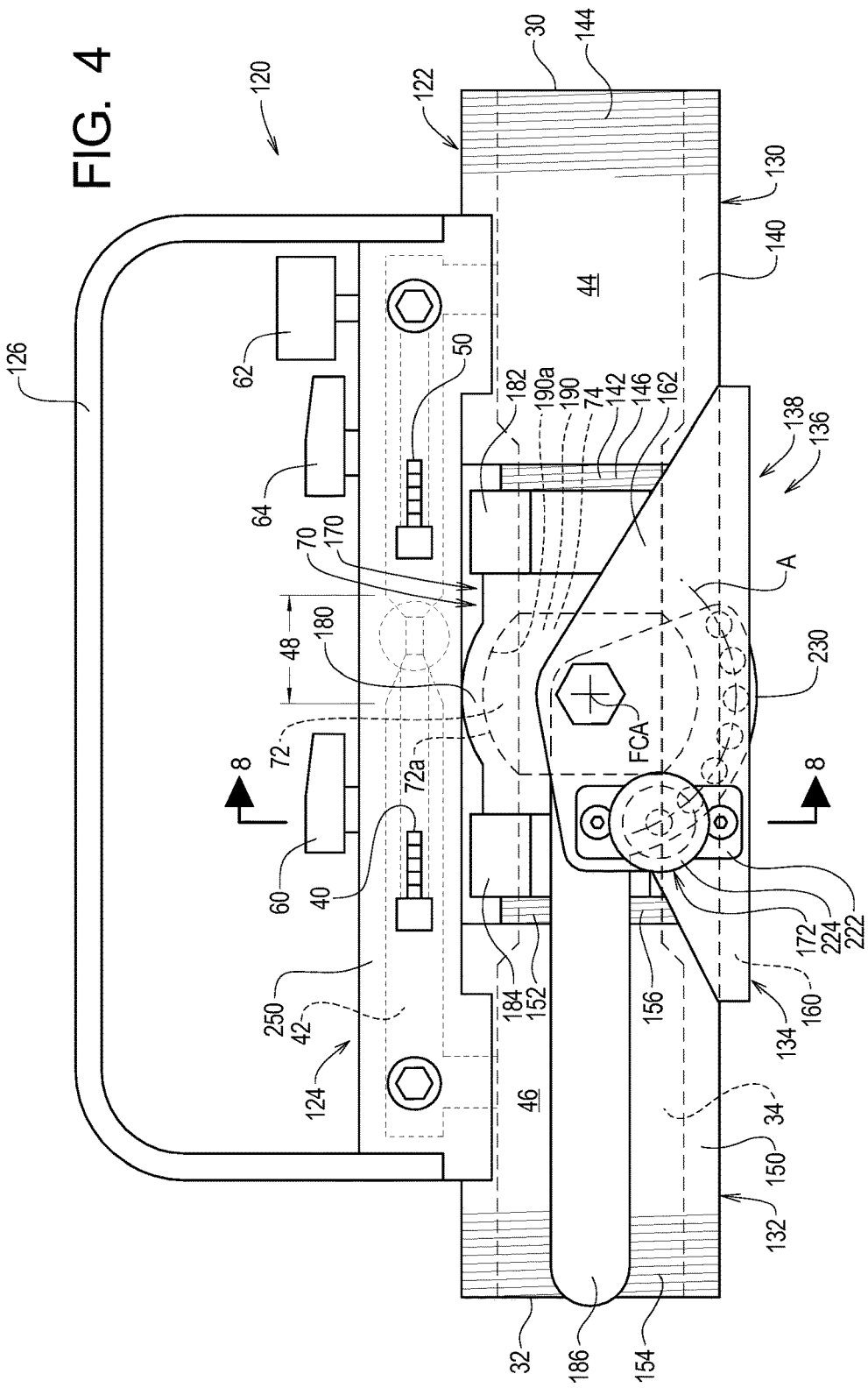
FIG. 4 is side elevation view of the first example water processing system with internal passageways indicated by broken lines, the first example water processing being depicted in the fully open configuration in FIG. 4.
Figure 5:
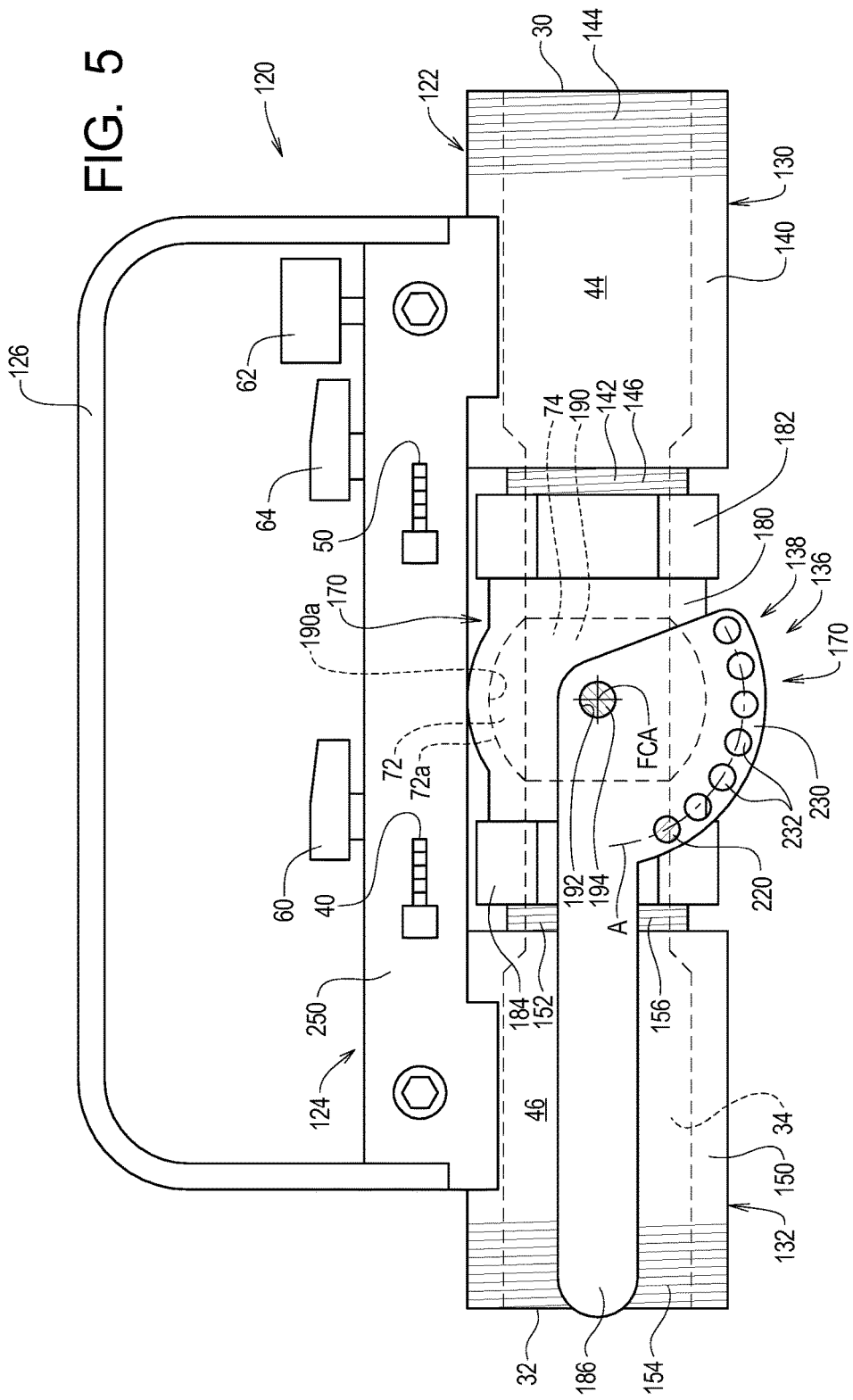
FIG. 5 is side elevation section view of the first example water processing system with internal passageways indicated by broken lines, the first example water processing being depicted in the fully open configuration in FIG. 5.
Figure 6:
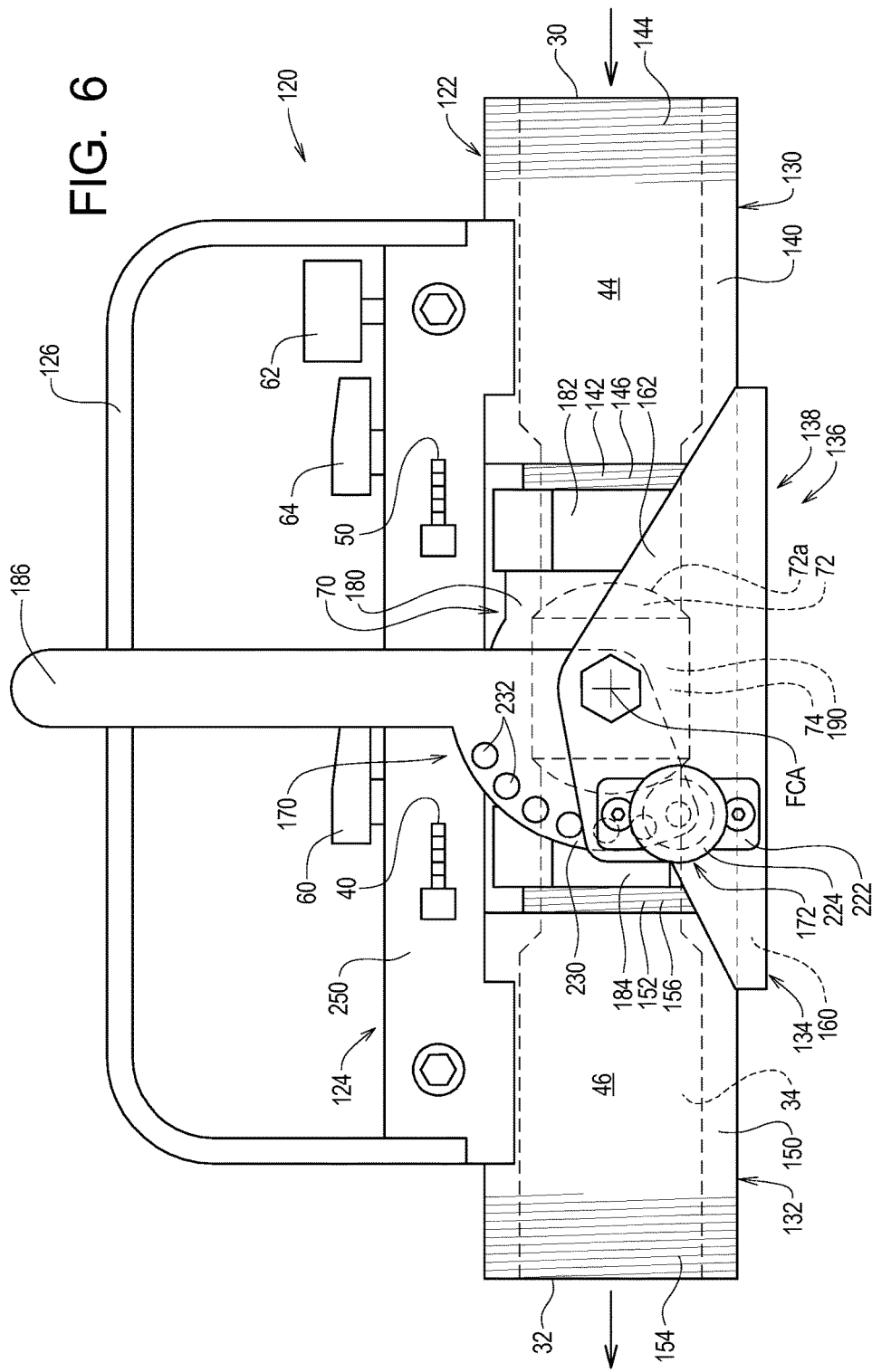
FIG. 6 is side elevation view of the first example water processing system with internal passageways indicated by broken lines, the first example water processing being depicted in the closed configuration in FIG. 6.
Figure 7:
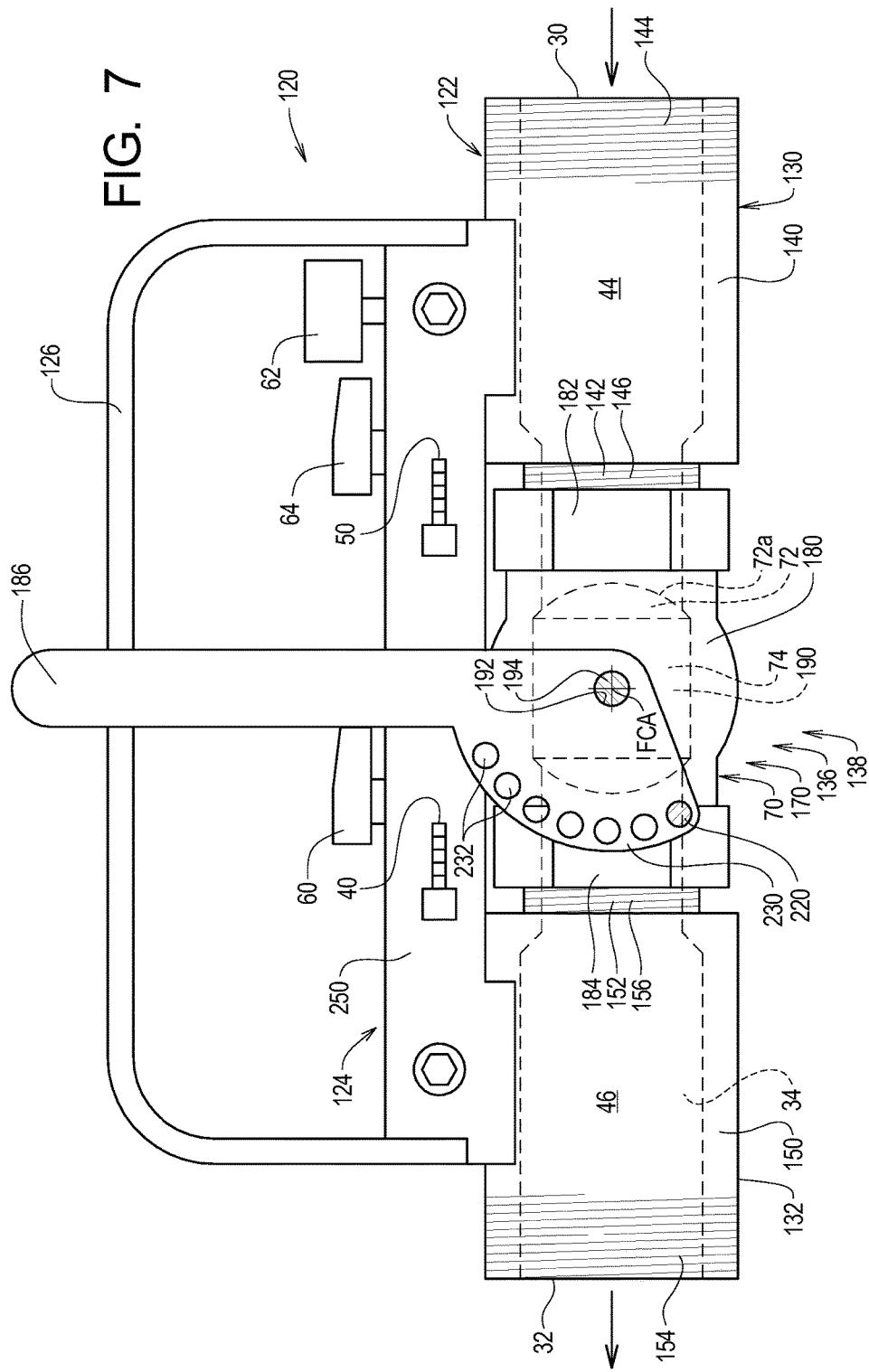
FIG. 7 is side elevation section view of the first example water processing system with internal passageways indicated by broken lines, the first example water processing being depicted in the closed configuration in FIG. 7.

Referring initially to FIGS. 1-3, depicted therein is a first example water processing system 20 that mixes unprocessed water 22 with additive concentrate 24 to obtain processed water 26. The unprocessed water 22 is introduced into the first example water processing system 20 through a primary inlet opening 30, and the processed water 26 exits the water processing system 20 through a primary outlet opening 32. A primary passageway 34 extends between the primary inlet opening 30 and the primary outlet opening 32. The primary outlet opening 32 directly or indirectly introduces the processed water into a discharge area (not shown). The discharge area is typically not contained, and thus any water introduced therein will eventually flow into rivers, streams, or the like and/or will seep into the groundwater.

The additive concentrate 24 is introduced into the first example water processing system 20 through a secondary inlet opening 40. In particular, a bypass passageway 42 extends between first and second portions 44 and 46 of the primary passageway 34. The bypass passageway 42 defines an injection portion 48, and the secondary inlet opening 40 is in fluid communication with the injection portion 48 of the bypass passageway 42. The geometry of the injection portion 48 of the bypass passageway creates, in effect, a venturi eductor that draws the additive concentrate 24 into the bypass passageway 42 during normal use of the first example water processing system 20.

An optional tap opening 50 allows unprocessed water 22 flowing through the bypass passageway 42 to be sampled during operation of the first example water processing system 20. The optional tap opening 50 is in fluid communication with the bypass passageway 42 between the first portion 44 of the primary passageway 34 and the injection portion 48 of the bypass passageway 42.

An additive valve 60 is arranged to control the flow of the additive concentrate 24 into the injection portion 48 of the bypass passageway 42. An optional gauge assembly 62 is arranged to measure flow of fluid through the bypass passageway 42. An optional tap valve 64 is arranged to control the flow of the sampled unprocessed water 22 flowing through the optional tap opening 50.

A first example flow controller 70 is arranged to control the flow of fluid through the primary passageway 34. The first example flow controller 70 comprises a flow control member 72 rotatable through an angle of approximately 90 degrees about a flow control axis FCA. The flow control member 72 defines a flow control passageway 74. As shown in FIGS. 1-3, the flow control member 72 rotates from a first end position (FIG. 1) to a second end position (FIG. 3) through a continuum of intermediate positions (e.g., FIG. 2).

When the flow control member 72 is in the first end position (FIG. 1), the first example water processing system 20 is in a fully open configuration, and the flow controller 70 defines a maximum flow rate through the primary passageway 34 for a given set of conditions. When the flow control member 72 is in the second end position (FIG. 3), the first example water processing system 20 is in a closed configuration, and the flow controller 70 defines a minimum flow rate through the primary passageway 34 for the given set of conditions. The minimum flow rate is typically zero (0) gallons per minute. When the flow control member 72 is in any one of the continuum of intermediate positions between the first and second end positions (e.g., FIG. 2), the first example water processing system 20 is in a partly open configuration, and the flow controller 70 defines an intermediate flow rate through the primary passageway 34 for the given set of conditions.

The intermediate flow rate is between the maximum flow rate and the minimum flow rate for the given set of conditions. Each of the continuum of intermediate positions will define a different intermediate flow rate. Further, the intermediate flow rate will typically decrease as the flow control member 72 is rotated from the first end position to the second end position. The exact decrease in flow rate as the flow control member 72 rotates from the first end position to the second end position may be linear or non-linear depending on factors such as the size, dimensions, and shape of the primary passageway 34 and the size, dimensions, and shape of the flow control passageway 74.

Turning now to FIGS. 4-9 of the drawing, a first example mechanical structure 120 that may be used to embody the first example water processing system 20 will now be described. The first example mechanical structure 120 comprises a main housing assembly 122, a bypass assembly 124, and a handle member 126.

The main housing assembly 122 comprises an inlet member 130, an outlet member 132, a support member 134, a flow control system 136, and a flow control assembly 138.

Figure 8:
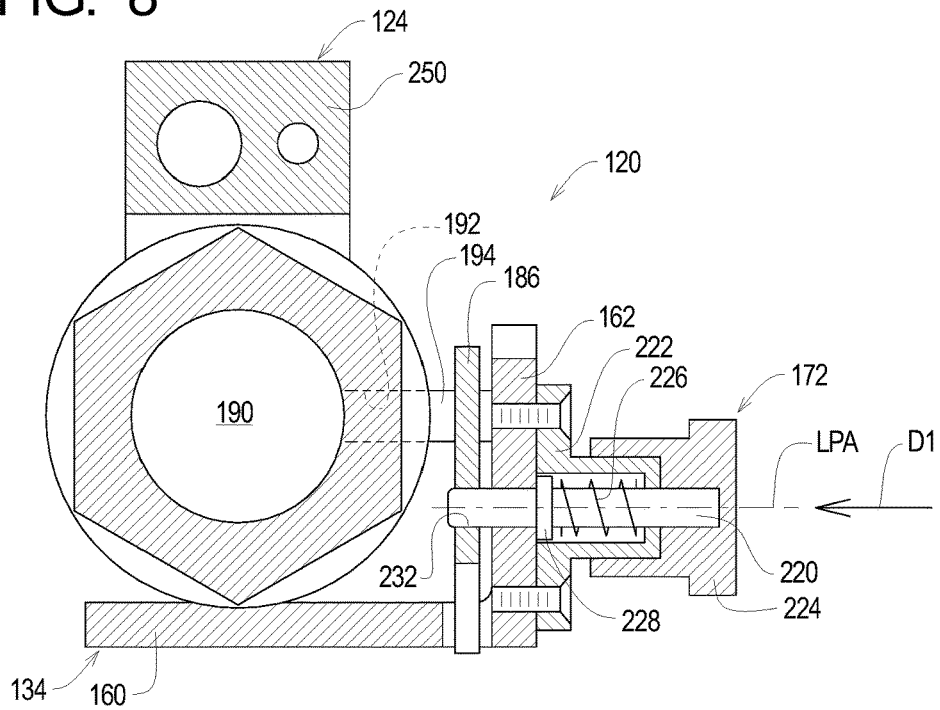
FIG. 8 is a section view taken along lines 8-8 in FIG. 4, with a locking mechanism shown in a locked configuration in FIG. 8.
Figure 9:
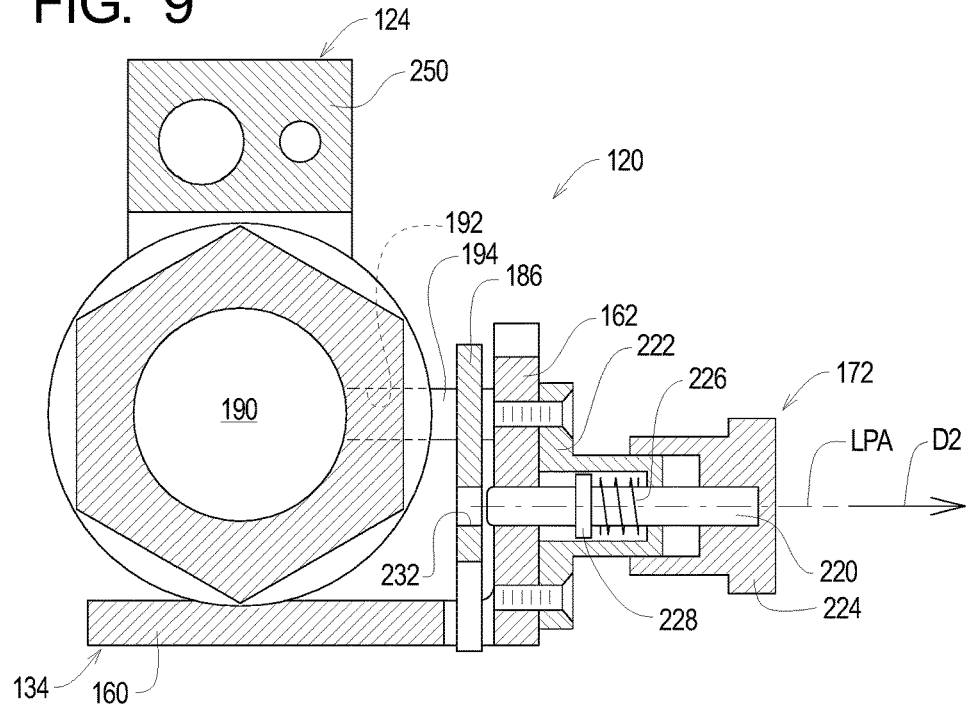
FIG. 9 is a section view similar to FIG. 8, with the locking mechanism shown in an unlocked locked configuration in FIG. 9.

The inlet member 130 comprises an inlet barrel portion 140 and an inlet connector portion 142. The inlet barrel portion 140 defines an inlet barrel threaded portion 144, and the inlet connector portion 142 defines an inlet connector threaded portion 146. The outlet member 132 comprises an outlet barrel portion 150 and an outlet connector portion 152. The outlet barrel portion 150 defines an outlet barrel threaded portion 154, and the outlet connector portion 152 defines an outlet connector threaded portion 156. As best shown in FIGS. 8 and 9, the support member 134 defines a first portion 160 and a second portion 162. The first portion 160 is rigidly secured to the inlet barrel portion 140 and the outlet barrel portion 150. The second portion 162 rigidly extends from the first portion 160; the example second portion 162 extends at an angle of approximately 90 degrees relative to the first portion 160.

The example flow control system 136 comprises a flow control assembly 170 and a lock assembly 172. The flow control assembly 170 comprises the flow control member 72, a flow control housing 180, a first connecting collar 182, a second connecting collar 184, and a flow control lever 186.

The example flow control housing 180 defines a flow control chamber 190 and one or more axle bores 192. A flow control axle 194 extends through the axle bores 192 to connect the flow control lever 186 to the flow control member 72 within the flow control chamber 190.

The flow control chamber 190 is configured to accommodate axial rotation of the flow control member 72 about the flow control axis FCA. In addition, a flow control member surface 72a defined by the flow control member 72 engage a flow control chamber surface 190a defined by the flow control housing 180 to inhibit flow of liquid between the surfaces 72a and 190a. The example flow control member surface 72a and the flow control chamber surface 190a are spherical in shape to allow rotation of the flow control member 72 within the flow control chamber 190 relative to the flow control housing 180.

The first connecting collar 182 is adapted to threadingly engage the inlet connection threaded portion 146, and the second connecting collar 184 is adapted to threadingly engage the outlet connection threaded portion 156 to secure the inlet member 130 and the outlet member 132 to the flow control housing 180.

In use, the flow control member surface 72*a* engages the flow control chamber surface 190*a* such that liquid flows through the primary passageway 34 from the primary inlet opening 30 to the primary outlet opening 32 only through the flow control passageway 74 in the flow control member 72. The effective surface area exposed by the flow control passageway 74 to the primary inlet opening 30 determines the flow rate of liquid along the primary passageway 34 for a given set of conditions.

As perhaps best shown in FIGS. 8 and 9, the example lock assembly 172 comprises a lock pin 220, a lock pin mount 222, a pin knob 224, a lock spring 226, and a spring retainer 228. The lock pin mount 222 is secured to the second portion 162 of the support member 134 and supports the lock pin 220 for linear movement along a lock pin axis LPA defined by a longitudinal axis of the lock pin 220. The example lock pin axis LPA defined by the lock pin 220 is spaced from and parallel to the flow control axis FCA about which the flow control member 72 rotates.

The lock spring 226 applies a biasing force to the lock pin 220 through the spring retainer 228 that resiliently opposes movement of the lock pin 220 in a first direction D1 along the lock pin axis LPA. However, the lock spring 226 is sized and dimensioned such that deliberate application of manual force on the pin knob 224 causes the lock pin 220 to move in a second direction D2 along the lock pin axis LPA.

The example lock assembly 172 further comprises a lock flange 230 rigidly secured to the flow control lever 186. A series of lock openings 232 are formed in the lock flange 230 in a circular arc A centered about the flow control axis FCA. The diameter of the circular arc A defined by the lock openings 232 is the same as a distance between the lock pin axis LPA and the flow control axis FCA. Accordingly, as the flow control lever 186 is rotated about the flow control axis FCA, the lock flange also rotates about the flow control axis FCA such that the lock pin axis LPA aligns with the lock openings 232 in the lock flange 230. Further, the first direction D1 along which the lock spring 226 forces the lock pin 220 is towards the lock openings 232.

Accordingly, to fix a position of the flow control lever 186 relative to the flow control housing 180, the lock spring 226 is allowed to force the lock pin 220 into one of the lock openings 232 corresponding to a desired angular position of the flow control member 72 within the flow control chamber 190. In FIG. 8, the example lock pin 220 is in a locked position in which the lock pin 220 extends through one of the lock openings 232 and engages the lock flange 230, and the example lock assembly 172 is in a locked configuration when the lock pin 220 is in the locked position. With the example lock assembly 172 in the locked configuration, movement of the flow control lever 186 is substantially prevented.

To move the flow control member 72 among a plurality of predetermined angular positions relative to the flow control chamber 190, the lock pin 220 is displaced in the second direction D2 against the force of the lock spring 226 to withdraw the lock pin 220 from any of the lock openings 232, allowing the flow control lever 186 to be rotated such that the flow control member 72 rotates between the first end (FIGS. 4 and 5) and second end (FIGS. 6 and 7) positions. In FIG. 9, the example lock pin 220 is in an unlocked position in which the lock pin 220 does not extend through any of the lock openings 232 and thus no longer engages the lock flange 230. The example lock assembly 172 is in an unlocked configuration when the lock pin 220 is in the unlocked position. With the example lock assembly 172 in the unlocked configuration, movement of the flow control lever 186 is allowed.

FIGS. 4-9 further illustrate that the example flow control assembly 138 comprises a bypass housing 250. The bypass housing 250 defines the secondary inlet opening 40, the bypass passageway 42, and the tap opening 50. The bypass housing 250 further supports the additive valve 60 and the gauge assembly 62. The bypass housing 250 is rigidly secured to the inlet barrel portion 140 of the inlet member 130 and the outlet barrel portion 150 of the outlet member 132 such that a bypass portion of the unprocessed water 22 flows from the first portion 44 of the primary passageway 34 to the second portion 46 of the primary passageway 34 through the bypass passageway 42. The handle member 126 is rigidly attached to the bypass housing 250 to facilitate carrying of the first example water processing system 20.

To use the first example water processing system 20, the inlet member 130 is connected to a source (not shown) of unprocessed water 22 and the secondary inlet opening 40 is connected to a source (not shown) of the additive concentrate 24. The flow of unprocessed water 22 through the primary passageway 34 will cause a small amount of unprocessed water 22 to flow through the bypass passageway 42 such that additive concentrate 24 is drawn into the bypass passageway 42. The unprocessed water 22 and additive concentrate 24 are mixed in the bypass passageway 42 such that the additive concentrate 24 is mixed the main flow of unprocessed water 22 in the second portion 46 of the primary passageway 34 to obtain the processed water 26.

The amount of additive concentrate 24 mixed with the unprocessed water 22 can be controlled using the additive valve 60 and the flow controller 70. Further, the lock assembly 172 allows the flow of unprocessed water through the primary passageway 34 to be fixed to ensure that the proper proportion of the additive concentrate 24 to the unprocessed water 22.

What is claimed is:

1. A water processing system for dechlorinating a stream of pressurized water comprising: a main housing assembly comprising flow control housing defining a flow control chamber, an inlet member defining an inlet opening configured to receive the stream of pressurized water, an outlet member defining an outlet opening, a flow control member supported within the flow control chamber for rotation about a flow control axis between a first end position and a second end position, the flow control member defining a flow control passageway, a flow control lever connected to the flow control member, a lock flange rigidly supported by the flow control lever, the lock flange defining a plurality of lock openings, and a lock housing secured relative to the flow control housing, and a lock pin supported by the lock housing for movement between a locked position and an unlocked position, where the flow control housing, the inlet member, and the outlet member define a primary passageway that extends from the inlet opening to the outlet opening through the flow control chamber; and a bypass housing supported relative to the main housing assembly to define an additive port and a bypass passageway extending between a first portion of the primary passageway, where the first portion of the primary passageway is between the inlet opening and the flow control chamber, and a second portion of the primary passageway, where the second portion of the primary passageway is between the flow control chamber and the outlet opening, where the bypass passageway defines an injection portion, and the additive port is in fluid communication with the injection portion of the bypass passageway; wherein when the lock pin is in the locked position, the lock pin extends through one of the lock openings in the lock flange to inhibit movement of the flow control lever relative to the main housing; and when the lock pin is in the unlocked position, the lock pin is withdrawn from the lock openings in the lock flange to allow movement of the flow control lever relative to the main housing.

2. A water processing system as recited in claim 1, further comprising a lock spring for biasing the lock pin into the locked position.

3. A water processing system as recited in claim 1, further comprising a lock knob to facilitate displacement of the lock pin from the locked position into the unlocked position.

4. A method of dechlorinating a stream of pressurized water comprising the steps of: providing a flow control housing defining a flow control chamber; providing an inlet member defining an inlet opening; providing an outlet member defining an outlet opening; operatively connecting the flow control housing, the inlet member, and the outlet member to define a primary passageway that extends from the inlet opening to the outlet opening through the flow control chamber; providing a flow control member defining a flow control passageway; supporting the flow control member within the flow control chamber for rotation about a flow control axis between a first end position and a second end position; operatively connecting a flow control lever to the flow control member; rigidly supporting a lock flange on the flow control handle, the lock flange defining a plurality of lock openings, and securing a lock housing secured relative to the flow control housing, supporting a lock pin by the lock housing for movement between a locked position and an unlocked position; providing a bypass housing defining a bypass passageway, an injection port, and an additive support in fluid communication with the injection port; supporting the bypass housing relative to the main housing assembly such that the bypass passageway extends between a first portion of the primary passageway, where the first portion of the primary passageway is between the inlet opening and the flow control chamber, and a second portion of the primary passageway, where the second portion of the primary passageway is between the flow control chamber and the outlet opening, where arranging the lock pin in the locked position such that the lock pin extends through one of the lock openings in the lock flange to inhibit movement of the flow control lever relative to the main housing; and arranging the lock pin in the unlocked position such that the lock pin is withdrawn from the lock openings in the lock flange to allow movement of the flow control lever relative to the main housing.

5. A method as recited in claim 4, further comprising the step of arranging a lock spring to bias the lock pin into the locked position.

6. A method as recited in claim 4, further comprising the step of securing a lock knob to lock pin to facilitate displacement of the lock pin from the locked position into the unlocked position.

\* \* \* \* \*